(12) United States Patent
Gallant et al.

(10) Patent No.: US 7,599,351 B2
(45) Date of Patent: Oct. 6, 2009

(54) RECURSIVE QUERY FOR COMMUNICATIONS NETWORK DATA

(75) Inventors: John Kenneth Gallant, Plano, TX (US); Kathleen A. McMurry, Richardson, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1583 days.

(21) Appl. No.: 10/099,097

(22) Filed: Mar. 15, 2002

(65) Prior Publication Data

US 2002/0136206 A1    Sep. 26, 2002

Related U.S. Application Data

(60) Provisional application No. 60/276,923, filed on Mar. 20, 2001, provisional application No. 60/276,953, filed on Mar. 20, 2001, provisional application No. 60/276,955, filed on Mar. 20, 2001, provisional application No. 60/276,954, filed on Mar. 20, 2001.

(51) Int. Cl.
 *H04L 12/66* (2006.01)
(52) U.S. Cl. .................. 370/352; 370/401; 370/466
(58) Field of Classification Search .................. None
See application file for complete search history.

(56) References Cited

U.S. PATENT DOCUMENTS 6,157,648 A    12/2000    Voit et al.
6,366,577 B1    4/2002    Donovan
6,937,597 B1 *   8/2005    Rosenberg et al. .......... 370/356
2001/0028644 A1  10/2001    Barzegar et al.
2002/0110113 A1*  8/2002    Wengrovitz .................. 370/352
2002/0184323 A1* 12/2002    Hamlin ........................ 709/206

OTHER PUBLICATIONS

Schulzrinne et al., "SIP Call Control Services", Internet Engineering Task Force, Internet Draft, Jun. 17, 1999.
Falstrom, P., "E.164 Number and DSN", Internet Engineering Task Force, Request for Comments 2916, Sep. 2000.
Schulzrinne et al., "RTP: A Transport Protocol for Real-Time Applications", Internet Engineering Task Force, Request for Comments 1889, Jan. 1996.
Handley et al., "SIP: Session Initiation Protocol", Internet Engineering Task Force, Request for Comment 2543, Mar. 1999.

* cited by examiner

*Primary Examiner*—Jayanti K Patel
*Assistant Examiner*—Jung Park

(57) ABSTRACT

An approach for providing telephony and other services over a data network is disclosed. A communications system includes a location server that generates a first subset from the set of all addresses relating to a called party. A proxy server obtains a first subset of addresses from the location server and attempts to establish a session with the called party based on the subset of addresses. In response to whether the first subset of addresses results in session establishment, the proxy server may then request a second subset from the location server. Context information provided by the location server with the first subset may be returned to the location server as part of the request for the second subset.

51 Claims, 13 Drawing Sheets

*FIG. 5*

502 — SIP/2.0 300 Multiple Choices

504 — Via: SIP/2.0/UDP 175.50.25.01:5060
Via: SIP/2.0/UDP 175.50.25.02:5060

506 — From:User A<sip:6546787@business.com>;tag=9587784
To: UserB<sip:6654372@business.com>
Call-ID: 1234567789@business.com
CSeq: 2 INVITE 508 — Contact: Term A1<sip:5551256@176.43.22.1>
Contact: Term B1<sip:8799652@176.51.26.1>
Contact: Term B2<sip:7156788@174.59.25.2>
Contact: Term B3<sip:8746733@173.60.35.3>
Contact: Term B4<sip:9856345@178.76.33.4>
Contact: Term A3<sip:7467777@176.23.24.6>
Contact: Term A4<sip:7587465@165.25.43.7>

500

700

702 — SIP/2.0 300 Multiple Choices

704 {
Via: SIP/2.0/UDP 175.50.25.01:5060
Via: SIP/2.0/UDP 175.50.25.02:5060

706 {
From: User A<sip:6546787@business.com>;tag=9588784
To: UserB<sip:6654372@business.com>
Call-ID: 123456789@business.com
CSeq: 2 INVITE 708 {
Contact: Term A1<sip:5551256@176.43.22.1>;final=yes  714
Contact: Term A2<sip:4536254@156.34.24.5>; final=no;contextinfo=... 710 712
Contact: Term A3<sip:7467777@176.23.24.6>;final=yes
Contact: Term A4<sip:7587465@165.25.43.7>;final=yes

FIG. 7

INVITE <sip: sip:4536254@156.34.24.5;final=no;contextinfo=...> SIP/2.0

Via: SIP/2.0/UDP 175.50.25.01:5060

Via: SIP/2.0/UDP 175.50.25.01:5060

Via: SIP/2.0/UDP 175.50.25.02:5060

From:User A<sip:6546787@business.com>;tag=958784

To: User B<sip:6654372@business.com>

Call-ID: 123456789@business.com

CSeq: 2 INVITE

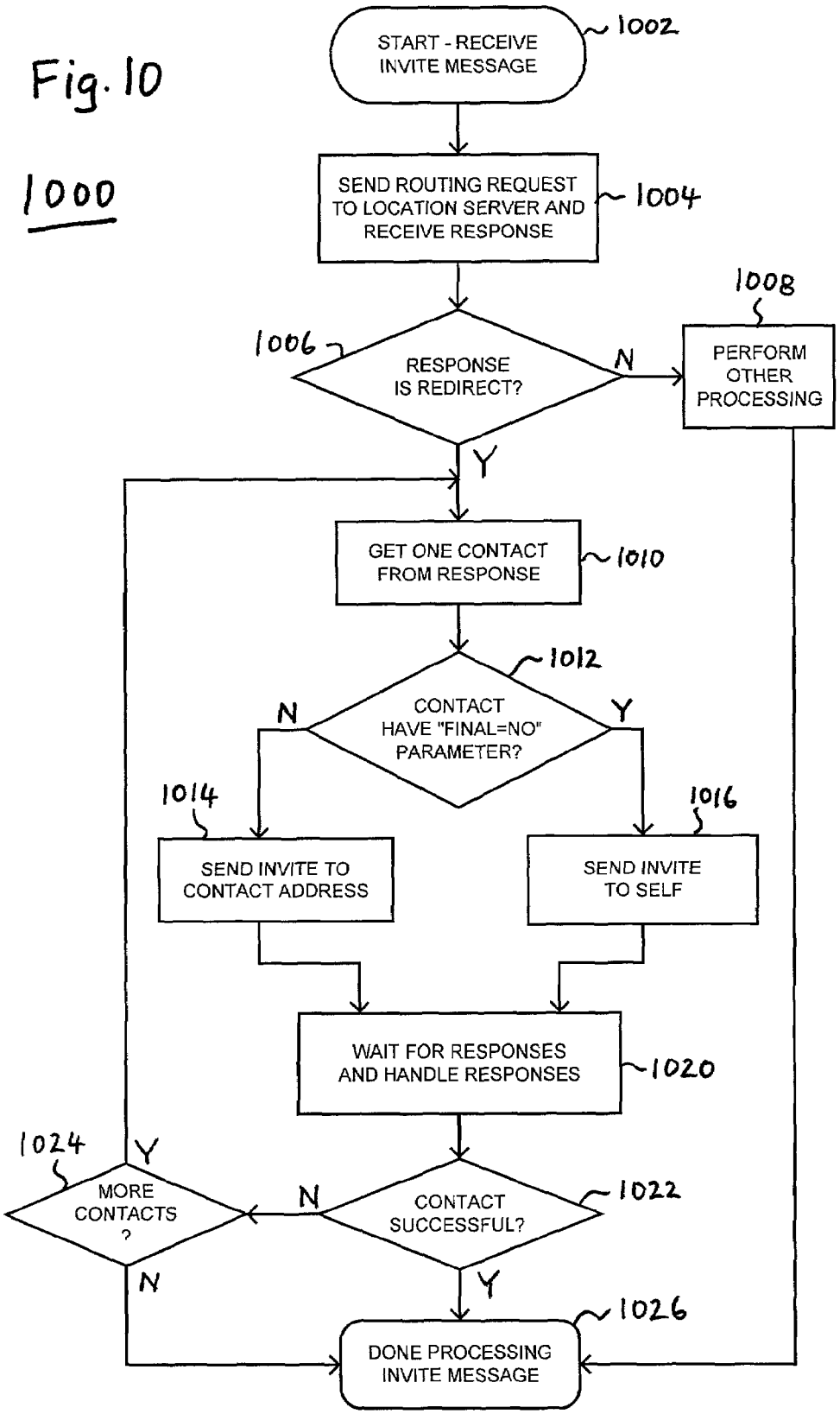

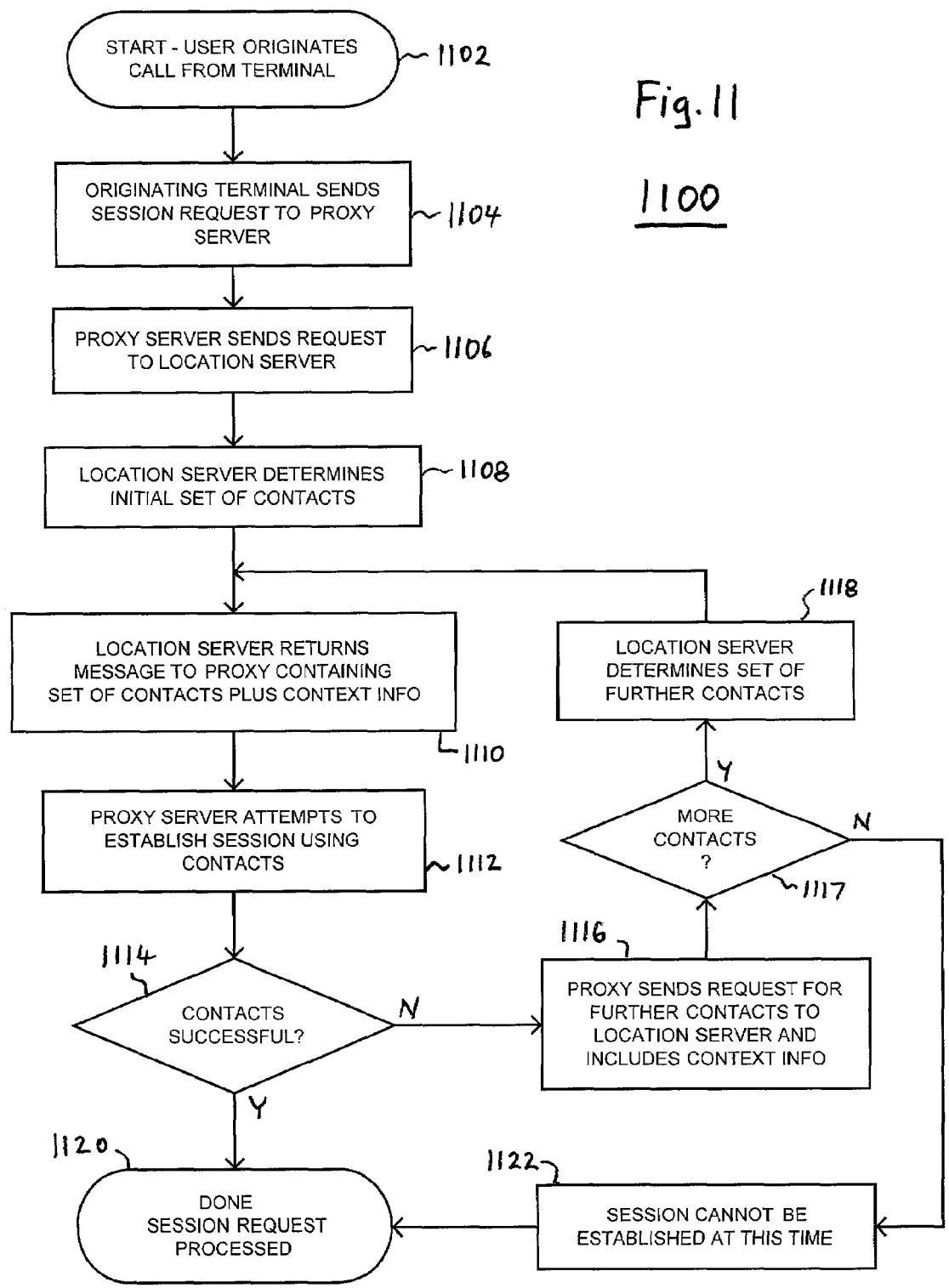

RECURSIVE QUERY FOR COMMUNICATIONS NETWORK DATA

RELATED APPLICATIONS

This application is related to, and claims the benefit of the earlier filing date under 35 U.S.C. § 119(e) of, U.S. Provisional Patent Application No. 60/276,923, filed Mar. 20, 2001, entitled "IP Communications," U.S. Provisional Patent Application No. 60/276,953, filed Mar. 20, 2001, entitled "IP Communications," U.S. Provisional Patent Application No. 60/276,955, filed Mar. 20, 2001, entitled "IP Communications," and U.S. Provisional Patent Application No. 60/276, 954, filed Mar. 20, 2001, entitled "IP Communications"; the entireties of which are incorporated herein by reference.

FIELD OF THE INVENTION

The present invention relates to a communications system, and is more particularly related to determining addresses for establishing communications sessions.

BACKGROUND

The proliferation of data transport networks, most notably the Internet, is causing a revolution in telephony and other forms of real-time communication. Businesses that have been accustomed to having telephony traffic and data traffic separately supported over different systems and networks are now moving towards so-called "converged networks" wherein telephone voice traffic and other forms of real-time media are converted into digital form and carried by a packet data network along with other forms of data. Now that the technologies are feasible to support it, voice over data transport offers many advantages in terms of reduced capital and operating costs, resource efficiency and flexibility.

For example, at commercial installations, customer premise equipment investments are substantially reduced as most of the enhanced functions, such as PBX and automatic call distribution functions, may reside in a service provider's network. Various types of gateways allow for sessions to be established even among diverse systems such as IP phones, conventional analog phones and PBXs as well as with networked desktop computers.

To meet the demand for voice over data transport, service providers and network equipment vendors are faced with the challenges of establishing new protocols and standards, recognizing new business models, implementing new services, and designing new equipment in a way that would have been difficult to imagine twenty years ago.

For example, a new generation of end user terminal devices are now replacing the traditional telephones and even the more recent PBX phone sets. These new sets, such as those offered by Cisco and Pingtel, may connect directly to a common packet data network, via an Ethernet connection for example, and feature large visual displays to enhance the richness of the user interface.

Even before such devices were developed, computers equipped with audio adapters and connected to the Internet were able to conduct some rudimentary form of Internet telephony, although the quality was unpredictable and often very poor. The emphasis now is upon adapting internet protocol (IP) networks and other packet transport networks to provide reliable toll-quality connections, easy call set-up and enhanced features to supply full-featured telephony as well as other forms of media transport. Some other types of media sessions enabled by such techniques may include video, high quality audio, multi-party conferencing, messaging and collaborative applications.

Of course, as a business or residential communications subscriber begins using such voice-over-packet communications to replace conventional telephony, there will naturally be an expectation that the quality of the connections and the variety of services will be at least as good as in the former telephone network. In terms of services, for example, some businesses have come to rely upon PBX features or network-resident "Centrex" features such as call forwarding and conditional call handling. In the near future, such special services are expected to see increased use because the new terminal devices mentioned earlier can provide a much more intuitive interface for the users. With existing systems, users often forget which combinations of keystrokes are required to invoke enhanced features.

For establishing a communications session in a network, new protocols and control architectures have emerged. It is worth noting that these have been inspired by the migration to a voice over data but are not necessarily limited to such an environment. In some respects the protocols and control architectures described next may be used to establish calls through any form of transport.

Both the ITU H.323 standard and the IETF's Session Initiation Protocol (SIP) are examples of protocols which may be used for establishing a communications session among terminals connected to a network. The SIP protocol is described in IETF document RFC 2543 and its successors. Various architectures have been proposed in conjunction with these protocols with a common theme of having an address resolution function, referred to as a "location server," somewhere in the network to maintain current information on how to reach any destination and to control features on behalf of users.

For large scale-deployment of voice over data transport as well as other real-time communications, it is essential that the network control architectures be extremely robust and highly scalable to reliably accommodate millions of sessions on a daily basis. Robustness may necessitate designing in redundancy and failover mechanisms. Preferably, these measures will even provide transparent continuity of existing sessions and features even if a failure occurs in the midst of a session. For ensuring this level of reliability and for maximizing scalability, it is generally preferable to minimize the demand upon control functions, such as location servers, to maintain any persistent state information for each call in the network.

SUMMARY

The need for robustness and scalability in a session processing system, as well as other needs, are addressed by the present invention in which an integrated communication system provides telephony and data services over a data network. The system utilizes, in an exemplary embodiment, the Session Initiation Protocol (SIP) for establishing communications sessions.

Briefly, a session is initiated in the following manner: The proxy server first receives a request, such as a SIP "INVITE" message, typically from a calling station where a first user desires to contact a second user. The second user may be identified by telephone number, IP address, or uniform resource locator (URL), for example. The proxy server may then relay a routing request to the location server for such purposes as verifying the privileges of the first user to reach the second user, finding one or more locations for the second user and performing any call handling features provisioned for the first or second users. Generally, the location server responds to the proxy's request by returning to the proxy server one or more addresses of terminals where the second user may be contacted.

Upon receipt of the address information from the location server, the proxy server commences to send an "INVITE" message, or the like, to each address. Thus, the proxy server attempts to reach the second user by trying the addresses either serially or in parallel.

Multiple addresses may be returned by the location server if, for example, a given user profile indicates a "Find-Me" list, that is, a set of contacts that should be tried for reaching the second user being called. By provisioning of their profile maintained by the location server, a user may specify, for example, that incoming calls go to an IP telephone first, then another phone, then a mobile phone and, if there is still no answer at those locations, then into a voice mail system.

An entry in a Find-Me list may be an address that represents yet another account within the network. This account may in turn have its own associated profile including a Find-Me list. Therefore, it is possible for a single called party requested by a user to correspond to a hierarchy of contact addresses in the location server.

This phenomenon places a considerable burden upon the location server because a potentially large number of contact addresses may have to be determined and returned for each INVITE request, even though the called party might be reached at one of the earliest contact addresses attempted by the proxy server.

In one aspect, the present invention provides an alternative approach wherein a large number of addresses may not have to be determined by the location server all at once. Instead, the location server may return a first set of addresses upon an initial routing request from the proxy server and then may return further addresses upon subsequent routing requests from the proxy server.

In accordance with a preferred embodiment, the location server returns a list of addresses, some of which may correspond to other accounts that will themselves yield multiple contacts. This initial list returned to the proxy does not include the complete "expanded" listing of these latter contacts. Instead, in accordance with a preferred embodiment, each such "expandible" address is merely reported in the initial list along with a flag or tag associated with the address to indicate that it may expand into multiple addresses. In working through the initial list of addresses, the proxy server uses this tag to trigger subsequent retrieval of the expanded address sets only if and when they are needed.

To enable the location server to efficiently handle these subsequent requests from the proxy without keeping persistent state information for the session, additional context information is provided with the each address returned by the location server to the proxy server. As the proxy server subsequently requests further contacts from the location server, the proxy server includes the context information in the subsequent requests. As will be explained in greater detail below, passing this context information back to the location server advantageously allows the location server to skip many steps that need only be performed for an initial routing request.

Freeing the location server from maintaining state in this manner is also especially important for allowing any of the available location servers to handle the subsequent requests. In other words, the location server servicing a subsequent request for an expanded address set does not have to be the same location server instance that provided the initial list. All of the location servers should operate equivalently and maintain a consistent image of the addressing and user profile information. The need to consult different location servers may arise due to failover or load balancing mechanisms.

In one aspect of the present invention, a method is disclosed for establishing a communications session with a party using multiple contacts. A location server maintains a set of contacts for the party. The method generally comprises the steps of obtaining an initial set of contacts from the location server, attempting to establish a session with the party using the initial set of contacts, and, if the session is not successfully established using the first set of contacts, obtaining a subsequent set of contacts to try.

In another aspect of the present invention, context information related to the processing that occurs in the location server is obtained from the location server in conjunction with a request for contacts for a party. The same context information is provided to the location server in conjunction with a subsequent request to facilitate processing of the subsequent request by the location server.

In another aspect of the present invention, one or more contacts obtained from a location server may trigger further requests to the location server.

In another aspect of the present invention, one or more contacts obtained from a location server may bear an indication of whether or not a subsequent request to the location server is appropriate for the given contact.

In another aspect of the present invention, a location server means is disclosed which is able to provide contact information for a party in response to initial and subsequent requests.

In accordance with a preferred embodiment, the location server means includes means for providing and receiving context information related to processing in the location server. Furthermore, in accordance with a preferred embodiment, the location server means includes means for providing a finality indicator with each contact provided in response to a request.

In another aspect of the present invention, a proxy server means is disclosed for handling session requests by obtaining contacts from a location server and attempting to establish a session with a party using the contacts provided. In accordance with a preferred embodiment, the proxy server means determines whether a session is established using the contacts and, in response, determines whether to obtain further contacts from the location server.

In accordance with a preferred embodiment, the proxy server means accepts processing context information from the location server in conjunction with obtaining one set of contacts and then provides the context information to the location server in conjunction with a subsequent request for contacts.

In accordance with a preferred embodiment, the proxy server means interprets a response from a location server to determine if a subsequent request for further contacts should be submitted. In accordance with a preferred embodiment, the proxy server means initiates a subsequent request for contacts from the location server in response to a contact provided in an earlier response. In accordance with a preferred embodiment, the proxy server means interprets an indicator associated with a contact to determine if a subsequent request should be submitted to the location server in response to the contact.

In another aspect of the present invention, a computer-readable medium is disclosed having computer executable instructions for carrying out a method for implementing the location server means.

In another aspect of the present invention, a computer-readable medium is disclosed having computer executable instructions for carrying out a method for implementing the proxy server means.

Still other aspects, features, and advantages of the present invention will be readily apparent from the following detailed description, simply by illustrating a number of particular embodiments and implementations, including the best mode contemplated for carrying out the present invention. The present invention is also capable of other different embodiments and its several details can be modified in various respects without departing from the spirit and scope of the present invention. Accordingly, the drawings and description that follow are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a diagram of a typical SIP multiple choices message in accordance with the prior art;

FIG. 7 is diagram of a SIP multiple choices message in accordance with a preferred exemplary embodiment of the present invention;

FIG. 8 is a diagram of an SIP INVITE message in accordance with a preferred exemplary embodiment of the present invention;

FIG. 10 is a flowchart of a process for handling session requests as performed by a proxy server in accordance with a preferred exemplary embodiment of the present invention;

FIG. 11 is a flowchart of a process in a communications system for obtaining and trying multiple contacts in subsets in accordance with a preferred exemplary embodiment of the present invention.

DETAILED DESCRIPTION

In the following description, well-known structures and devices may be shown in block diagram form or otherwise summarized in order to avoid unnecessarily obscuring the present invention. For the purposes of explanation, numerous specific details are set forth in order to provide a thorough understanding of the present invention. It should be understood however that the present invention may be practiced in a variety of ways beyond these specific details.

For example, although the present invention is discussed in the context of the Session Initiation Protocol (SIP) and an Internet Protocol (IP)-based network, one of ordinary skill in the art will recognize that the present invention may be generally applicable to other equivalent or analogous communication protocols or communications networks.

It should be understood throughout this disclosure that, although SIP-type messages are shown for convenience, any type of protocol or a mixture of such protocols may be applied in various parts of the overall system. In particular, the routing requests and responses between the proxy server and location server may strictly or loosely conform to SIP or some other standardized protocol, or may be proprietary in nature.

Figure 1:
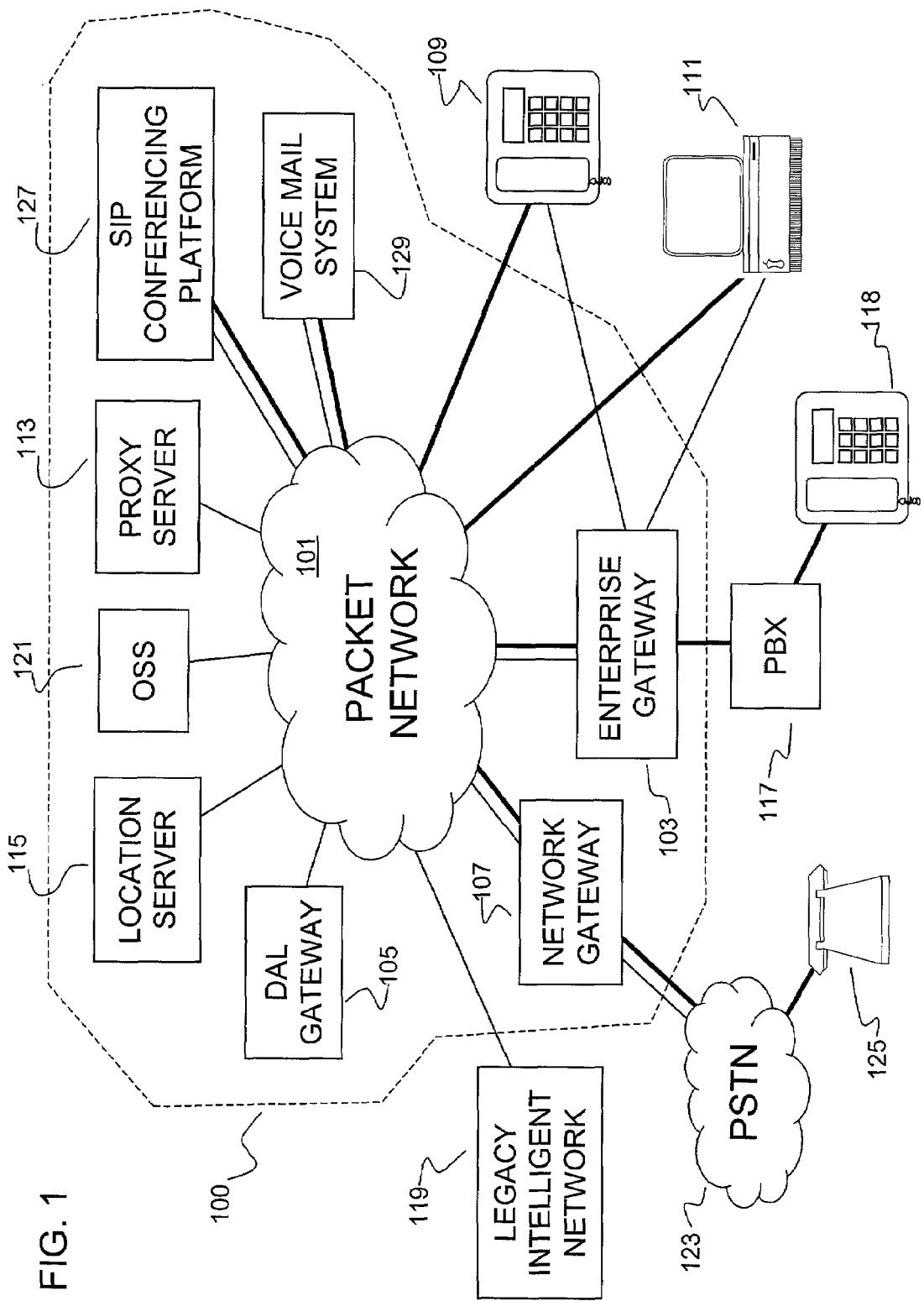
FIG. 1 is a diagram of a data communications system capable of supporting voice services, in accordance with an exemplary embodiment of the present invention.

FIG. 1 shows a diagram of a data communications system capable of supporting voice services, in accordance with an exemplary embodiment of the present invention. The communication system 100 includes a packet data transport network 101, which in an exemplary embodiment is an Internet Protocol (IP) based network. System 100 provides the ability to establish communications among various terminal equipment coupled thereto, such as telephone 125, PBX phone 118 and SIP phone 109. In practice, there may be thousands or millions of such terminal devices served by one or more systems 100.

As used herein, the term "SIP phone" refers to any client (e.g., a personal computer, a web-appliance, etc.) that is configured to provide SIP phone functionalities. The SIP phones 109 may take the form of standalone devices—e.g., a SIP phone may be designed and configured to function and appear like a Plain Old Telephone Service (POTS) telephone station. A SIP client 111, however, is a software client and may that run, for example, on a conventional personal computer (PC) or laptop computer. From a signaling perspective, these devices 109, 111 may operate quite similarly, with the main differences relating to the user interface. Unless otherwise stated, it is recognized that the functionalities of both the SIP phones 109 and the SIP client 111 are comparable and that the network operates similarly with either type of device.

The system 100 provides a number of elements to support the voice services, including an enterprise gateway 103, a Dedicated Access Line (DAL) gateway 105, a network gateway 107 and SIP conferencing platform 127. In particular, system 100 comprises the important elements of a proxy server 113 (also known as a network server (NS)) and a location server (LS) 115. Location server 115 serves as a repository for end user information to enable address validation, feature status, and real-time subscriber feature configuration. Additionally, LS 115 may store configuration information.

For the purposes of explanation, the capabilities of system 100 are described with respect to large enterprise users. It is noted that the feature/functionality of system 100 may be applicable to a variety of user types and communications needs. System 100 is able to support customers that maintain multiple locations with voice and data requirements.

As shown, enterprise gateway 103 provides connectivity from a PBX 117, which contains trunks or lines often for a single business customer or location (e.g., PBX phones 118). Signaling for calls from PBX 117 into the IP network comprises information which uniquely identifies the customer, trunk group, or carrier. This allows private numbers to be interpreted in their correct context. To interface to PBX 117, enterprise gateway 103 may use Integrated Digital Services Network (ISDN), Circuit Associated Signaling (CAS), or other PBX interfaces (e.g., European Telecommunications Standards Institute (ETSI) PRI, R2).

The Dedicated Access Line (DAL) gateway 105 is employed in system 100 to allow virtual private network (VPN) customers to be able to access their service even from a conventional telephone not served by the VPN.

Through system 100, communications may be established among the voice stations 125 that are serviced through the PSTN 123 and personal computers (e.g., PC 111) that are attached to packet data network 101.

Keeping in mind the similar nature of PC soft clients and standalone IP telephones, it maybe said that four possible scenarios exist with the placement of a voice over IP call: (1) phone-to-phone, (2) phone-to-PC, (3) PC-to-phone, and (4) PC-to-PC. In the first scenario of phone-to-phone call establishment, a call from the phone 125 is switched through PSTN 123 by a switch to the network gateway 107, which forwards the call through the IP backbone network 101. The packetized voice call is then routed through network 101, perhaps to another similar network gateway 107, to be at another PSTN phone (not shown). Under the second scenario, the phone 125 places a call to a PC through a switch to the PSTN 123. This voice call is then switched by the PSTN 123 to the SIP network gateway 107, which forwards the voice call to a PC 111 via the network 101. The third scenario involves a PC 111 that places a call to a voice station (e.g., phone 125). Using a voice encoder, the PC 111 introduces a stream of voice packets into the network 101 that are destined for the SIP network gateway 107. The SIP network gateway 107 converts the packetized voice information into a POTS electrical signal, which is circuit switched to the voice station (e.g., phone 125). Lastly, in the fourth scenario, a PC 111 establishes a voice call with another PC (not shown); in this case, packetized voice data is transmitted from the PC 111 via the network 101 to the other PC (not shown), where the packetized voice data is decoded.

As mentioned, system 100 may employ SIP to exchange session setup messages. Another popular session establishment protocol is referred to as the H.323 protocol, although it is actually a set of related protocols promulgated by the International Telecommunication Union (ITU) for accomplishing multimedia communication. SIP is an alternative standard that has been developed by the Internet Engineering Task Force (IETF). SIP is a signaling protocol that is based on a client-server model, generally meaning that clients invoke required services by messaging requests to servers that can provide the services. Similar to other IETF protocols (e.g., the simple mail transfer protocol (SMTP) and Hypertext Transfer Protocol (HTTP)), SIP is a textual, humanly readable protocol.

It may be noted that neither the H.323 or SIP protocols are limited to IP telephony applications, but have applicability to multimedia services in general. In one embodiment of the present invention, SIP is used to establish telephone calls and other types of sessions through system 100. However, it will be apparent to those of ordinary skill in the art that the H.323 protocol (with some modifications or extensions) or other similar protocols could be utilized instead of SIP. Separate from SIP, but often used in conjunction with SIP, is the Session Description Protocol (SDP), which provides information about media streams in the multimedia sessions to permit the recipients of the session description to participate in the session.

The Internet Engineering Task Force's SIP protocol defines numerous types of requests, which are also referred to as methods. An important method is the INVITE method, which invites a user to a conference. Another method is the BYE request, which indicates that the call may be released. In other words, BYE terminates a connection between two users or parties in a conference. Another method is the OPTIONS method. This method solicits information about capabilities without necessarily establishing a call. The REGISTER method may used to provide information to a SIP server about a user's present location.

Details regarding SIP and its call control services are described in IETF RFC 2543 and IETF Internet Draft "SIP Call Control Services", Jun. 17, 1999; both of these documents are incorporated herein by reference in their entireties.

Transmission of SIP messages can take place in an IP network through the well known User Datagram Protocol (UDP) or through the more reliable Transaction Control Protocol (TCP). Whereas SIP, H.323, or other protocols may be used to establish sessions through a data network, the actual media or "traffic" that is to be communicated among users may take place according to the well known Real-time Transport Protocol(RTP) as described in the IETF document RFC 1889.

It is likely, though not essential, that all of the call control signaling (SIP, H.323), media traffic(RTP/RTCP) and network management and provisioning will be communicated through common transport network 101. Thus, in FIG. 1, all of the elements appear in a hub arrangment around transport network 101.

In the traditional telephone network, calls are directed to specific locations or terminal devices uniquely identified by the called telephone number. In contrast, system 100 enables the caller to specify a called party to be reached independent of any particular location or terminal.

The user may move from one terminal to another and, at each terminal, may register as being present so that inbound calls are directed to the most recently registered location. Furthermore, a user may have both personal and group-wise profile settings that affect the activation of features, such as call blocking, even as a function of the time of day.

Because of the dynamic nature of user location and of call handling features, each request to establish a session is first routed to a proxy server so that user permissions may be verified, destination addresses may be found, and special features related to a user or a business may be applied to the call. Requests are serviced internally or by passing them on, possibly after translation, to other servers. A proxy interprets, and, if necessary, rewrites a request message before forwarding it.

In general, location server 115 accepts a routing request, such as from a proxy server, and determines addresses or "contacts" corresponding to the destination party expressed in the routing request. In response to the request, the location server may return a redirect response comprising contact information for the party. It is noted that messaging between NS 113 and LS 115 may use a modified version of SIP. For example, SIP acknowledge messages may be unnecessary between NS 113 and LS 115. Otherwise, messaging among network functions, such as NS 113 and LS 115, may use standard SIP or even non-SIP alternatives.

System 100 further includes an Operational Support Systems (OSS)121 to provide provisioning, billing, and network management capabilities. OSS 121 may provide an environment or an interface, such as a web-based interface, for provisioning many aspects of dialing plans, user permissions and how features operate on behalf of each user. Many of these aspects are configured via OSS 121 by changing information within location servers or databases within system 100. Some specific features that may be configured by OSS 121 include legacy Centrex features such as Unconditional Call Forwarding, Conditional Call Forwarding, Call Blocking and Call Screening.

One feature that may be configured involves the so-called "Find-Me" service. A Find-Me schedule provides a mechanism to route calls using a list of possible destinations, wherein each destination is tried in turn. A Find-Me list may be specified to apply during a time-of-day or day-of-week or may be associated with different categories of calling numbers. Furthermore, a default Find-Me list might be provisioned to determine general handling when the more specific Find-Me lists are not in effect.

The possible destinations in a Find-Me list can be specific addresses associated with an account's profile. For instance, a specific cell-phone number or wire-line phone number can be a possible destination address. Furthermore, as a user registers their presence at a terminal, such as a SIP phone, the address of the terminal may be temporarily added to the Find-Me list.

For a SIP phone profile, the Find-Me list can contain specific destination addresses provisioned in the user profile, and/or a reference to current registered addresses. For a traditional phone behind an enterprise gateway profile, the Find-Me list can contain specific destination addresses provisioned in the user profile and/or a reference to the user's PBX-phone. The Find-Me list feature can be enabled for a user during account creation and then updated by the user. Entries made to the Find-Me list may be verified against the Feature Blocking List for the subscriber's dial plan. The user profile has a link to update the Find-Me list. Specifically, the system 100 allows the user to Create, Read, Update, and Delete an inventory of potential devices, which can be used for populating Find-Me listings.

SIP phones 109 allow users to register and de-register, or login and logout, from the phone. In an exemplary embodiment, to provide mobility, SIP phones 109 permit usernames and passwords to be entered for visitors. Logging in allows the SIP phone to assume the profile of the visitor. By logging in, incoming calls to the visitor's profile are directed to the phone. When a visitor logs in, SIP phones 109 register the visitor with the Network Server 113 and Location Server 115. Any incoming call to any of the profiles registered by the phone can be directed to the phone. Network Server 113 and Location Server 115 may respond similarly to both situations where a user is logged in as a visitor or where the user is logged in to their usual home device, if there is one. The Network Server 113 and Location Server 115 logic may rely upon the user name delivered as a result of the proxy authorization challenge.

With respect to E.164 and DNS addressing, SIP phones 109 may support ENUM (Electronic Number) service, which is be used to route calls that originate in the IP domain or with ENUM-enabled networks. ENUM service is detailed in IETF RFC 2916, entitled "ENUM", which is incorporated herein by reference in its entirety. The SIP phones 109 may also support LINCP for client-based directory lookup.

A "Do Not Disturb" feature may be available at a terminal so that incoming calls are declined and, in the case of telephones and pagers for example, no ringing occurs to disturb users nearby. When "Do Not Disturb" is invoked on a SIP phone 109, the SIP phone 109 returns a Busy message if contacted by NS 113. For example, the phone returns a busy signal instead of ringing when an incoming call arrives. When the SIP phone 109 returns a "486 Busy" message, the Network Server 113 and Location Server 115 can make intelligent routing decisions based on a user profile, such as whether a Call Forwarding On Busy feature has been provisioned.

Figure 2:
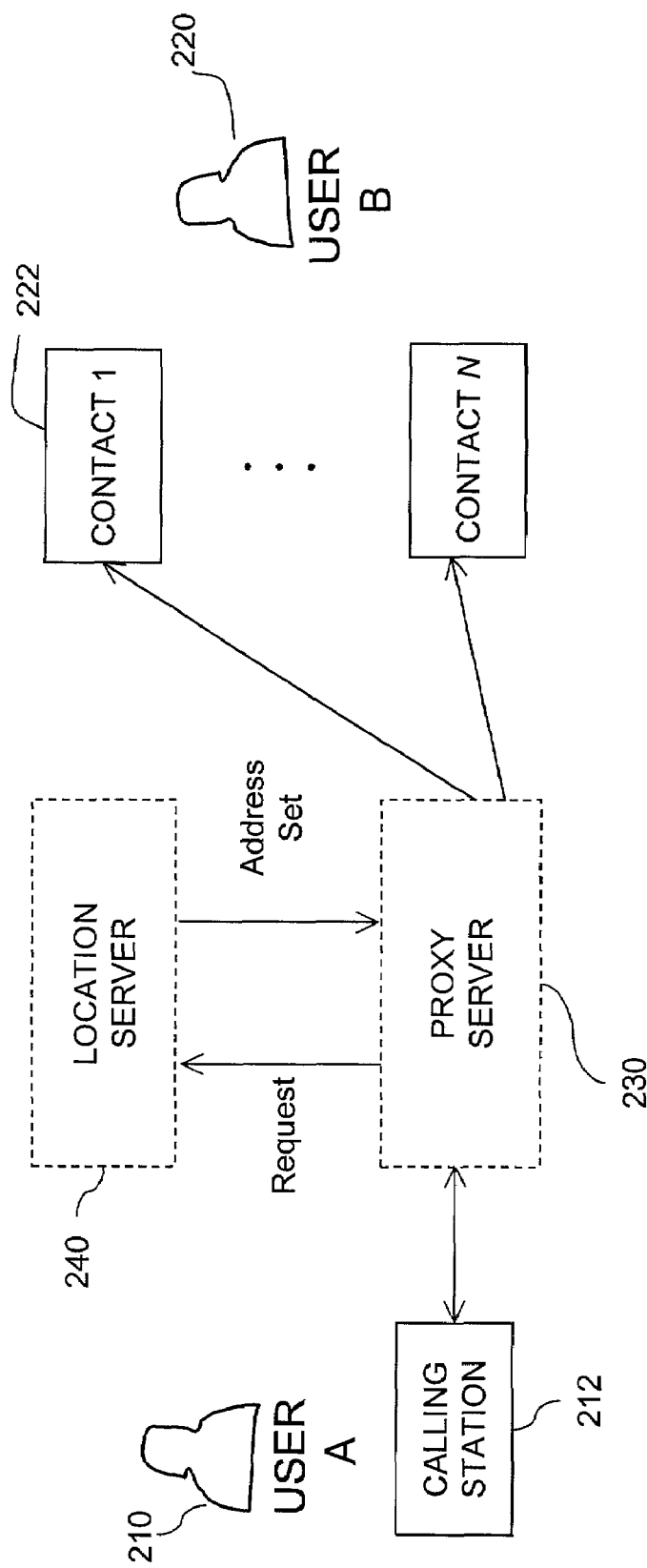
FIG. 2 is a diagram of functional elements involved in establishing a session among parties according to an exemplary embodiment of the present invention.

FIG. 2 is a diagram depicting the typical interaction of basic elements according to the prior art to perform a session setup by using the SIP protocol. Communications among these elements will typically take place through a common packet data network such as IP network 101 in FIG. 1.

In FIG. 2, User A 210 desires to establish communications with User B 220. User B 220 may be reachable at any one of several addresses. These addresses or contacts may correspond to conventional telephones, IP phones, wireless phones, pagers, etc. The list of addresses may even be changing as User B moves about and registers as being present at various terminal devices 222. The current information about User B's contact information is typically maintained in location server 240 or in a presence registry of some type not shown here.

To initiate contact, User A 210 accesses a terminal, calling station 212, and specifies User B as the destination to be reached. This expression of the specific desired destination may take the form of dialing of digits or of selecting a user name or URL-style address from a list. In some cases, User A may also be able to express what type of session is desired (video, high quality, messaging,etc.) or specify a desired quality level for the session. Once the request is specified at station 212, a SIP "INVITE" message describing the request is composed and sent to proxy server 230.

Proxy server 230 typically forwards a request to location server 240 to retrieve one or more contacts at which User B might be reached. As described earlier, proxy server 230 consults location server 240 for a variety of purposes, such as invoking profile-controlled feature behavior and obtaining the latest known location information pertaining to User B.

Location server 240 analyzes the request and responds to proxy server 230 in one of several possible ways. Location server 240 may disallow the session if User A is not permitted to contact User B, if User B's address cannot be recognized, or if User B has a feature activated that renders User B unreachable by User A. Location server 240 may respond to proxy server 230 that User A must authenticate themselves to the system before the session can be established.

Location server 240 may determine that User A is allowed to contact User B and may even find multiple addresses at which User B may be reachable. If this is the case, location server 240 returns a SIP "300 Multiple Choices" message containing a list of the contacts to be tried.

Upon receiving such a response, proxy server 230 then commences trying the contacts to see if User B can successfully be reached at any of the corresponding terminals 222. This "Find-Me" functionality is usually carried out in sequence starting with the most recent registered location or following a specific order as provisioned for User B (phone then pager). In some configurations, it is conceivable that proxy server 230 may attempt all contacts in parallel. An attempt to establish contact with a terminal 222 involves sending a SIP "INVITE" to the terminal and waiting for a reply indicative of success or failure. This process is described in greater detail in FIG. 3.

Figure 3:
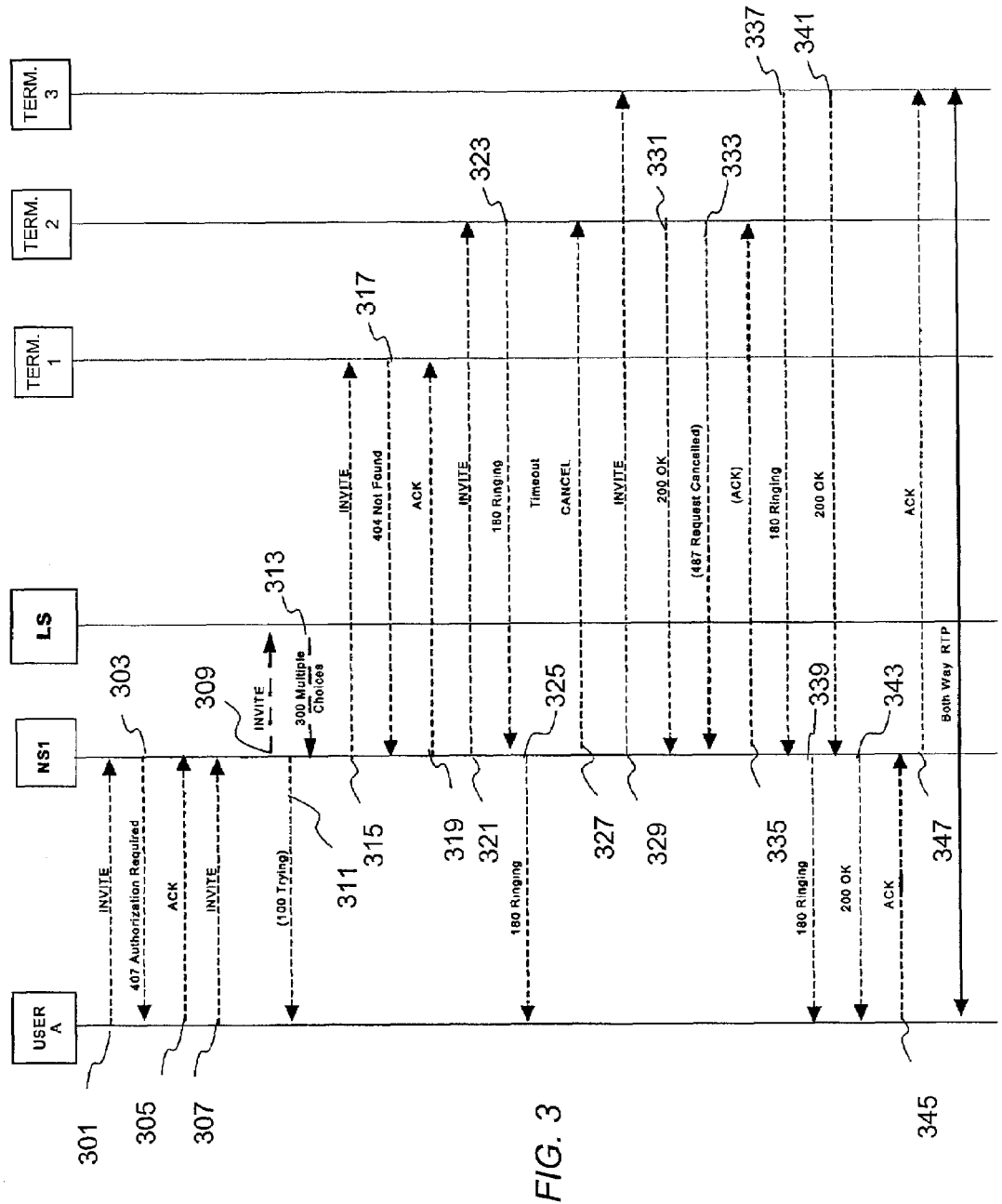
FIG. 3 is a call flow diagram describing how messaging typically occurs to establish a session when a destination party may have multiple contacts.

FIG. 3 is call flow diagram depicting the typical sequence of messaging that occurs among various elements to establish a session using the SIP protocol, although other protocols could be used. In this example, the station associated with User A is denoted "User A." However, because User B may be associated with any number of devices (or clients) under the Find-Me feature, these devices are referred to as "Terminal 1", "Terminal 2", and "Terminal 3." It is noted that, in general, any number of terminations (i.e., destination clients) may be specified in the Find-Me list of User B. Under this scenario, it is assumed that User B is eventually reached via Terminal 3.

Each terminal device User A and Terminals 1, 2, and 3 can be a SIP phone or other type of phone and may be coupled through an enterprise gateway or a network gateway 107 or the like. User B has a Find Me feature as part of their profile, resulting in multiple contacts to be tried. Based on this, NS1 responds to User A's request to reach User B by sending INVITE messages first to Terminal 1, then Terminal 2, then Terminal 3, where the call finally completes. In this example, Terminals 1, 2 and 3 are assumed to be SIP phones. Each instance of a message being sent from one element to another will be referred to as a step, as in a process or sequence.

In step 301, a SIP "INVITE" message indicating User A's intent to reach User B is sent from User A's terminal to the proxy, NS1. In step 303, the proxy responds with a SIP "407 Authorization Required" message to challenge the authenticity of User A before honoring any requests. To provide closure on this initial exchange, User A sends back a SIP acknowledgement message to the proxy in step 305.

User A subsequently repeats the INVITE request in step 307, but this time includes an authentication header in response to the challenge of step 303. If the authentication of User A is satisfactory, then, in step 309, the INVITE is forwarded to the location server. The location server begins examining the request and determining whether User B has a profile and what features are currently active. In the meantime, a "100 Trying" provisional response is sent back to the User A terminal as a call progress indicator of sorts. Soon thereafter, the location server responds in step 313 with a SIP "300 Multiple Choices" message indicating that it has found the Find-Me list for User B. This response comprises a list of contacts at which communication with User B should be attempted, in this case Terminals 1, 2 and 3.

The proxy NS1 then begins trying the contacts sequentially. In step 315, NS1 sends an INVITE message to Terminal 1, whereupon Terminal 1 responds in step 617 with a "404 Not Found" message. This indicates that User B will not be reachable at Terminal 1. NS1 acknowledges the "404" message by sending back an "ACK" message in step 319. Without this acknowledgement, Terminal 1 would repeat the "404" response at intervals to make sure its response had been received.

In step 321, proxy NS1 attempts contact via Terminal 2 by sending an INVITE message. In step 323, Terminal 2 sends back a "180 Ringing" provisional response as a progress indicator telling the calling party that the terminal is ringing (telephone) or otherwise alerting users in the vicinity of an incoming call. In step 325, this ringing message is passed from the proxy to the User A terminal. Eventually, after Terminal 2 has been ringing for awhile without being answered, a timeout is declared and NS1 issues a "CANCEL" message in step 327 so that Terminal 2 will stop ringing.

Proxy NS1 then tries to reach User B via Terminal 3 and sends an INVITE message to Terminal 3 in step 327. While this new contact is being started, Terminal 2 happens to respond to the earlier "CANCEL" by sending back a "200 OK" message in step 331. Terminal 2 then sends a "487 Request Cancelled" message in step 333 to indicate its understanding of the recent cancellation. Proxy NS1 terminates the transaction with Terminal 2 by sending an "ACK" in step 335 confirming that the call attempt to Terminal 2 is cancelled.

In step 337, Terminal 3 sends back a "180 Ringing" response, which is repeated back to User A in step 339. In step 641, Terminal 3 sends a "200 OK" message indicating that the call has been accepted at this terminal. The "200 OK" is sent back to the User A terminal as well in step 343. Acknowledgement of the viable connection is returned in steps 345 and 347. At this point, User A's terminal and Terminal 3 are now mutually aware of each other's addresses and a two-way RTP media connection may be established through the network between User A and User B.

Figure 4:
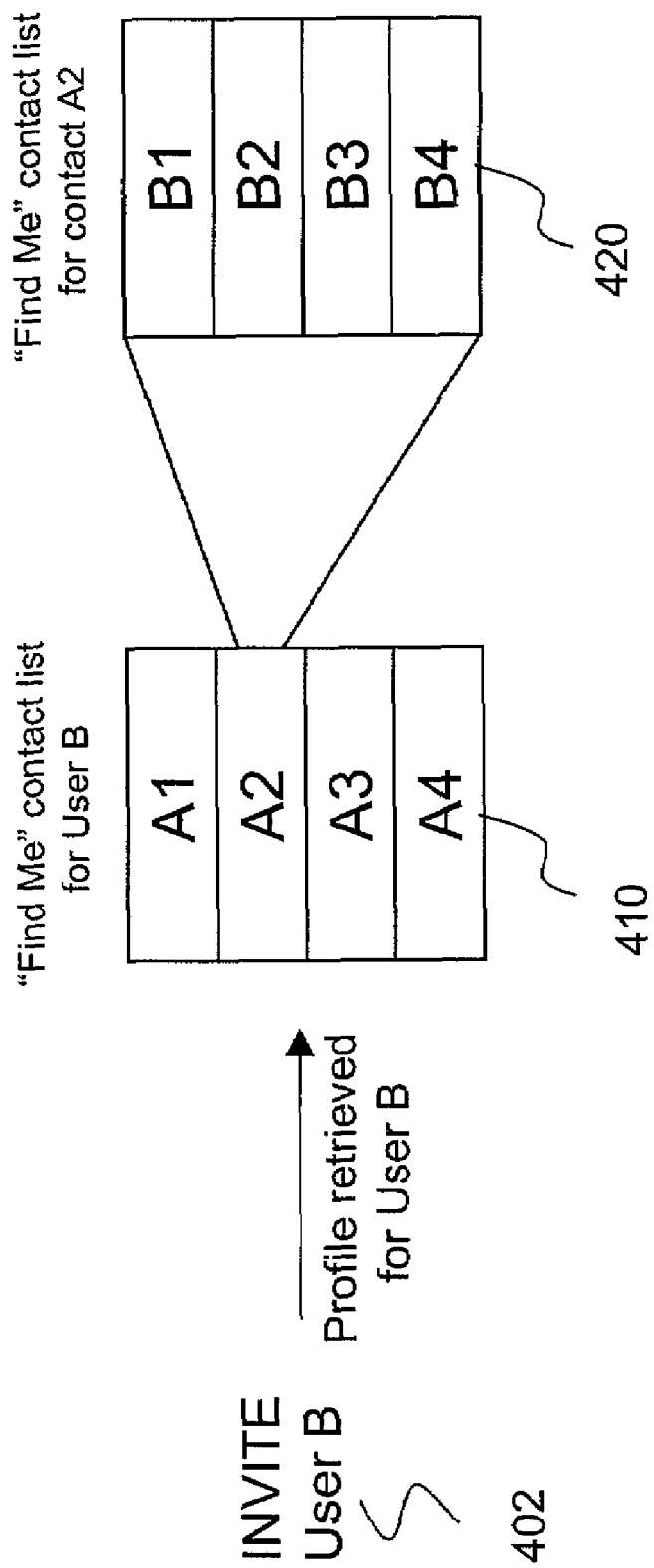
FIG. 4 is a schematic depicting an example nesting of contacts for a destination party.

To afford an understanding of the present invention and an appreciation of its advantages, FIG. 4. depicts a situation that is both enabled and properly handled in accordance with a preferred embodiment of the present invention.

In FIG. 4, an INVITE message 402 identifying User B is received by a location server. After perhaps verifying the validity of other aspects of the request, the location server determines a first contact list 410 pertaining to User B at the time of the request. Among the first list of contacts 410, one or more of the contacts may in fact represent other accounts having profiles accessible by the location server. For example, as shown in FIG. 4, contact A2 in the first contact list 410 may have a profile that in turn specifies a second contact list 420. It is conceivable that a first contact list might comprise some number of contacts, each of which might have a profile specifying a further list of contacts. This effect may continue to any depth. It may be readily demonstrated that a very large number of contacts may follow from a single inquiry. The calculation of all of these contacts may be burdensome for a location server and yet may be largely unnecessary if the called party is reachable within the first few contacts attempted. The present invention seeks to improve scalability and efficiency by lessening this burden on the location server.

FIG. 5 depicts a typical redirect response message 500 as might be returned by a location server in the situation set forth in FIG. 4. For convenience, message 500 is shown to be patterned after a SIP "300 Multiple Choices" message, although other formats may be used. Message 500 is identified as a "multiple choices" response by virtue of the first header line 502. The path that message 500 has traversed in going from an originating terminal to a proxy server is reflected in the set of "Via" address lines 504. This "via stack" aspect of SIP is useful for routing messages among proxy servers, location servers, terminals and other SIP-conversant elements involved in setting up the session. Other typical header information relating to the call is provided in header section 506 and is usually copied from the original INVITE message sent by the originating terminal. Contact section 508 comprises the list of contacts that location server has determined for User B. In reponse to message 500 a proxy server will consult contact section 508 and begin sending INVITE messages to each contact in the list. It should be observed that message 500 is representative of the situation wherein all of the possible contacts for User B have been calculated and returned in a single message.

Figure 6:
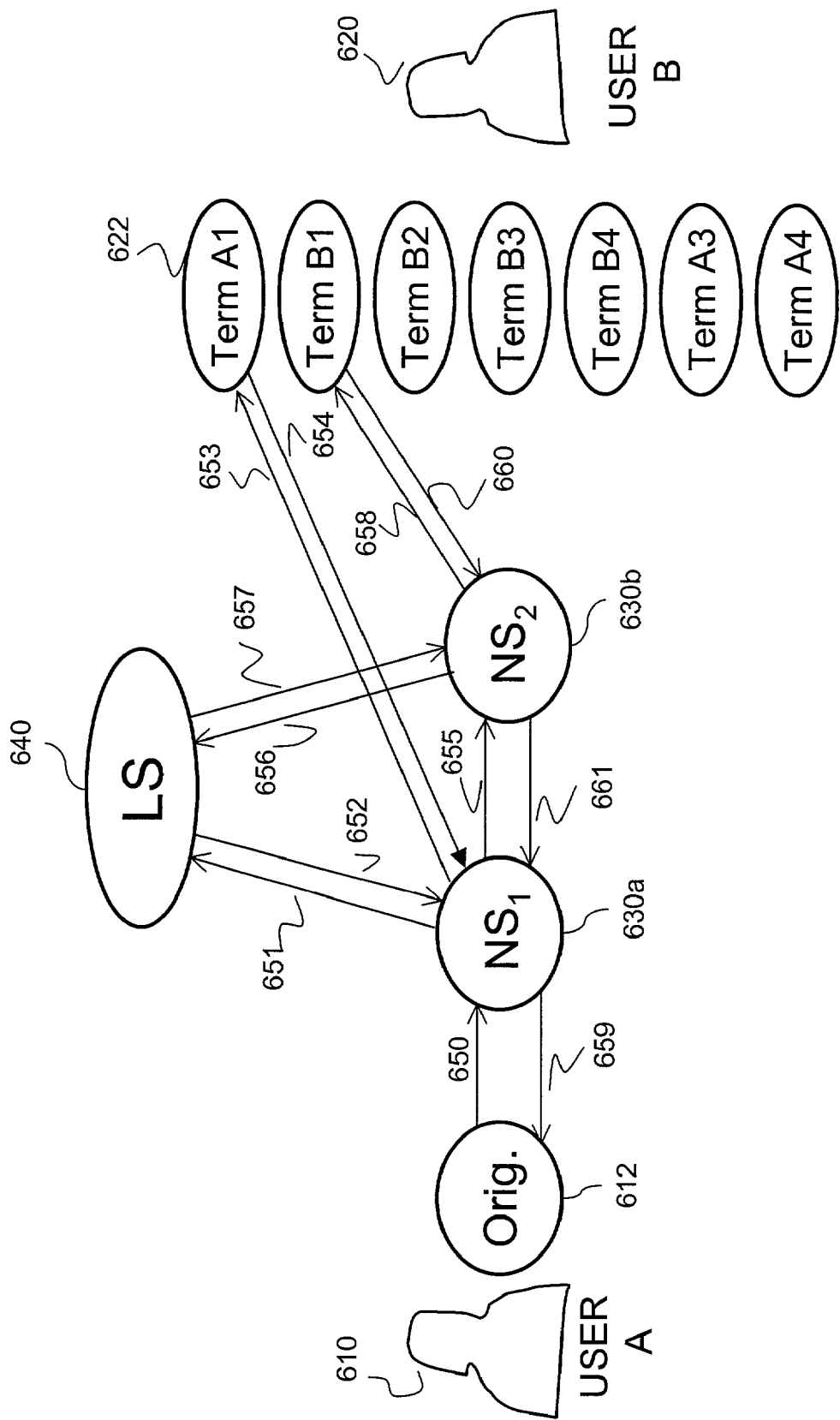
FIG. 6 is a block diagram of functional elements involved in session initiation in accordance with a preferred exemplary embodiment of the present invention.

FIG. 6 is a schematic of interaction among elements to establish a session in accordance with a preferred exemplary embodiment of the present invention. As in the previous scenarios, a User A 610 desires to establish a session with a User B 620 who may be at one of several different contacts. Note that, in this example, contacts 622 are consistent with the situation depicted in FIG. 4.

User A originates the session request using terminal 612, which then assembles a SIP INVITE message indicating the intent to reach User B. Along message path 650, terminal 612 sends the INVITE message to a SIP proxy server, network server(NS) 630a. To obtain information on where User B may be contacted, NS 630a sends a routing request to a location server, represented by location server (LS) 640, as indicated by message path 651. This routing request may optionally take the form of a SIP INVITE message. After processing the routing request, LS 640 responds to NS 630a along message path 652. For purposes of illustration this response is assumed to resemble the SIP "300 Multiple Choices" message depicted in FIG. 7.

Turning briefly to FIG. 7, SIP message 700 is representative of a response from a location server in accordance with an exemplary embodiment of the present invention. SIP message 700 is identified as "multiple choices" response by header 702. As described before, the set of "via" headers 704 are used for routing of SIP messages among SIP elements such as NS 630a and LS 640. Section 706 of message 700 comprises information identifying the call and the parties to be involved in the session.

Sections 702, 704 and 706 are comparable to the prior art SIP message shown in FIG. 5. However, contact section 708 is significantly different than section 508 of FIG. 5. In section 708, the contact list is noticeably shorter than section 508, even though the call circumstances are equivalent. Moreover, each contact listed in section 708 further comprises an added parameter not found among the contacts in section 508. Specifically, some contacts have a "final=yes" parameter 714. In accordance with a preferred embodiment of the present invention, these correspond to contact addresses for which no further location server look-up is necessary. In other words, these are addresses that do not have profiles that could result in further addresses. One entry in contact section 708 has a "final=no" parameter 710 along with context info parameter 712. In accordance with a preferred embodiment, this parameter indicates that the contact may have a corresponding profile that could elicit further contact addresses, although these further addresses have not yet been explored. Contact list section 708 may be compared to the situation of FIG. 4 to clearly show why the initial response from LS 640 indicates contact A2 as being "non-final".

For a clear understanding of how NS 630a responds to these parameters or "flags" in the contact list, it is useful to now resume the explanation of FIG. 6. Upon receiving the "multiple choices" response from LS 640, NS 630a begins the sequence of messaging to each contact in the contact list provided by LS 640. As seen in message 700, the first contact A1 has a "final=yes" parameter indicating that no further address look-up is required. Accordingly, NS 630a simply sends an INVITE message along message path 653 directly to a terminal 622 corresponding to contact A1. This activity is similar to the customary way in which a proxy attempts to reach a destination.

It is possible that terminal 622 may return a "404 Not Found" message as a final response, indicating that User B will definitely not be reachable at the contact. Alternatively, terminal 622 may return a provisional response along message path 654, such as a "180 Ringing" message to indicate that the terminal is trying to summon someone to answer the call.

If User B is successfully reached at contact A1, then terminal 622a returns a "200 OK" message whereupon User A and User B establish a media connection with each other and the session is successfully started. Response messages from terminal A1 may be returned to originating terminal 612 along message path 659.

If User B is not reached at contact A1, then NS 630a proceeds to contact A2 listed in section 708. Contact A2 bears a "final=no" parameter 710, representing the possible existence of a secondary list of addresses such as contact list 420. In accordance with a preferred embodiment of the present invention, NS 630a sends an INVITE message to itself rather than to a terminal contact. This behavior is depicted in FIG. 6 by the presence of NS 630b. NS 630b is actually the same proxy server as NS630a, although it is likely be a different instance of the proxying process in the processing environment of the server. Showing NS 630a and NS 630b separately is helpful for illustrating the messaging behavior. Upon reaching the non-final A2 contact, the proxy server sends an INVITE message to itself along message path 655. An example of this INVITE message is shown as message 800 in FIG. 8. In accordance with a preferred exemplary embodiment, the Request-URI portion 802 of message 800 carries additional information copied directly from the A2 contact list entry seen in message 700. The significance of this added information will become more apparent in later description.

Upon receipt of the INVITE message from NS 630a, NS 630b is instantiated just as if a new INVITE message had been received from an originator. The self-addressed INVITE message along path 655 is handled as any other incoming INVITE message. Accordingly, NS 630b sends a routing request along message path 656 to LS 640 to seek contact information for the addressee, in this case contact A2. It is at this time that LS 640 "expands" the single A2 contact into the longer list of contacts comprising contacts B1 through B4. LS 640 returns this list in a response to NS 630b along message path 657. NS 630b then attempts to contact User B at these locations B1-B4. For example, NS 630b first sends an INVITE message to terminal B1 along message path 658. The responses from each contact attempt are returned to the proxy and the originator through message paths 660, 661 and 659. This return messaging behavior is part of the SIP mechanism.

If none of contacts B1-B4 are successful, then NS 630a continues with addresses A3 and A4. In the present example, NS 630b is only engaged for exploring the additional addresses associated with contact A2. Contacts A1, A3 and A4 are merely carried out directly by NS630a in the usual manner without the creation or utilization of NS 630b.

Notice also that, in this scenario, if User B were to be successfully reached at contact A1, then all of the following activities would be obviated, thereby reducing the burden upon LS 640:

1) Address lookup of contacts B1-B4 based on the profile of contact A2
2) Other feature invocations related to the A2 profile
3) Use of second NS 630b
4) Messaging along paths 655,656,657,661.

In the example scenario shown, the retrieval of an initial set of addresses along paths 651 and 652 would take place exactly once in accordance with an exemplary embodiment, resulting in the contact list of message 700 being returned to NS 630a. (Other preparatory messaging among the NS and LS might occur during authentication of User A, for example.)

In the example scenario shown, messaging along paths 655, 656 and 657 would occur only once resulting in the list of B1-B4 contacts being returned to NS 630b, and even then only after contact A1 proved unsuccessful. NS 630b would then send an INVITE to each of the four contacts B1-B4.

To generalize beyond the specific scenario, the "messaging to self" represented by NS 630b and message paths 655, 654, 657, and 669, would be repeated once for each non-final contact listed in the redirect response returned along message path 652.

Furthermore, it is possible that one or more of the second tier contacts, such as contacts B1-B4 might also have a profile that yields further addresses. If this is encountered, an additional level of nesting occurs and the proxy server again sends an INVITE message to itself. As can be envisioned upon FIG. 6, this would amount to the instantiation of a third NS receiving INVITE messaging from second NS 630b.

Figure 9A:
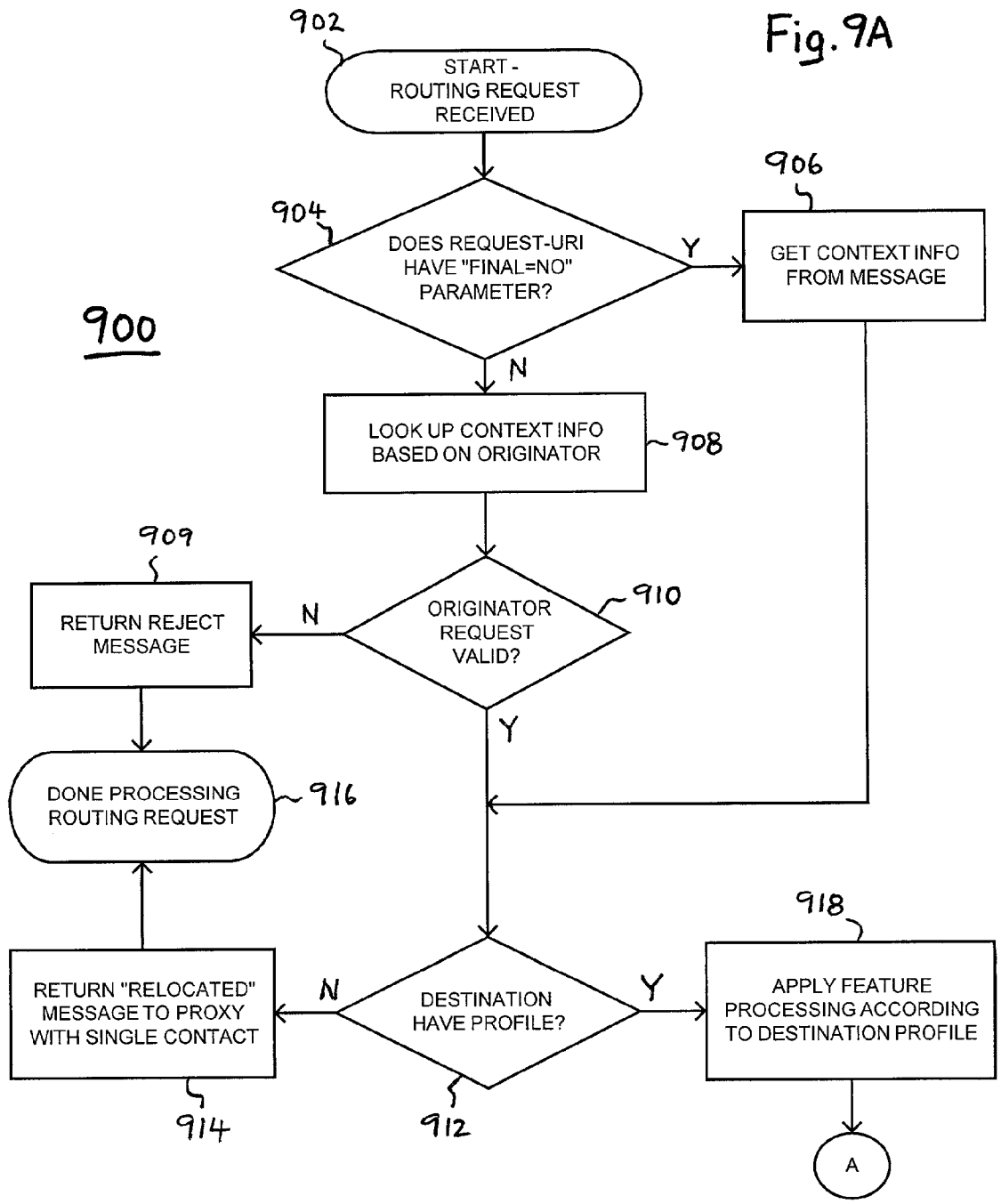
FIGS. 9A-9B is a flowchart of a process for handling session requests as performed by a location server in accordance with a preferred exemplary embodiment of the present invention.
Figure 9B:
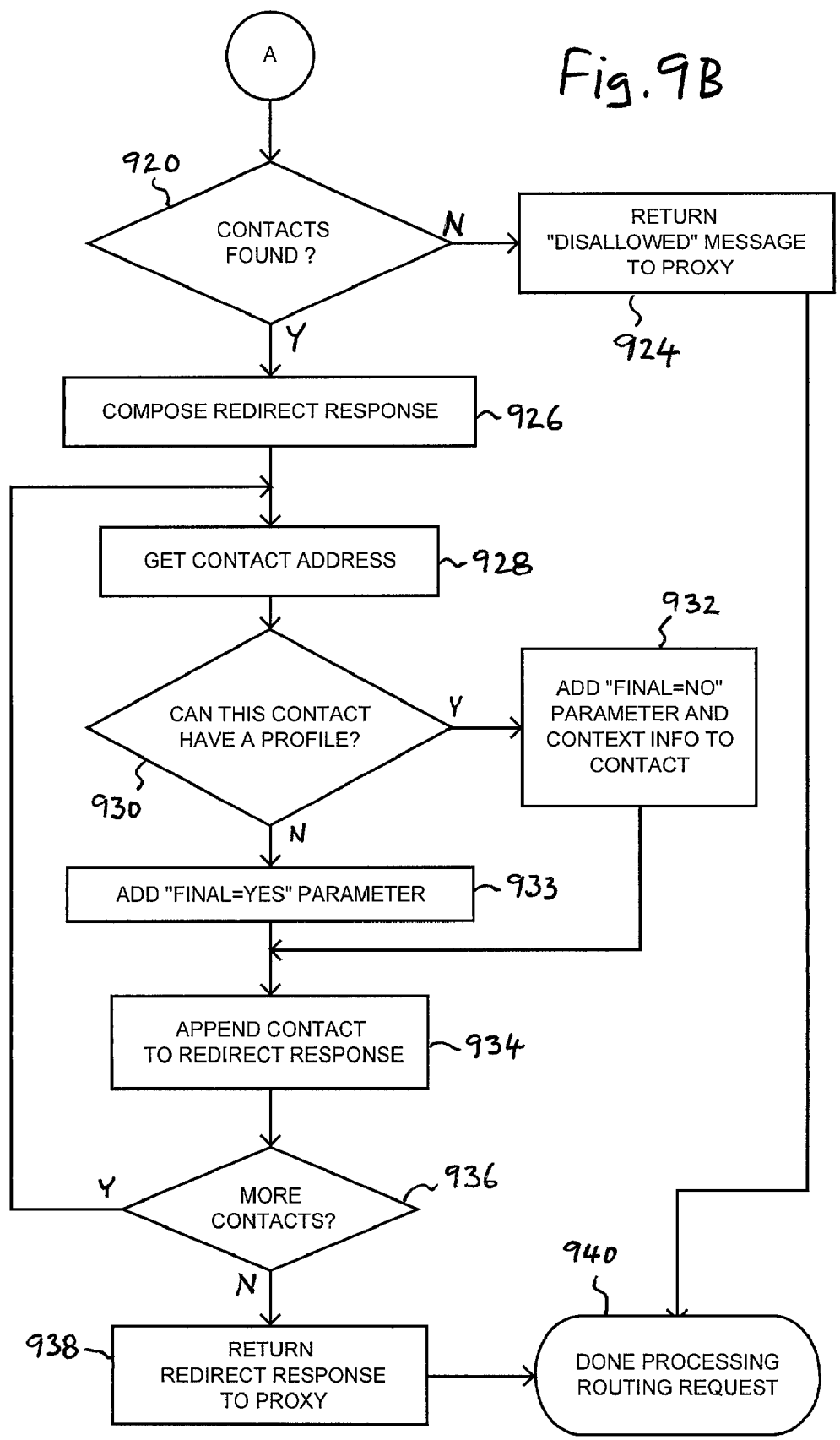

Further description is now provided to reinforce the understanding of the above processes as well as to describe how the context information parameter mentioned thus far enhances the efficiency and robustness of the technique. The description will now focus upon processes performed by a location server and a network server. FIGS. 9A-B is a flowchart describing a process 900 by which a location server handles inbound routing requests. Other processing, such as the processing of other types of messages, may take place in the location server but is not important to an understanding of the present invention. The processing of other types of SIP messages is well understood among those of ordinary skill in the art and is excluded here for the sake of clarity and brevity.

Process 900 commences with step 902 upon the receipt of an incoming routing request. Then in step 904, it is determined whether the contact portion, such as the Request-URI portion of an INVITE message, bears a "final=no" parameter similar to parameter 804 in FIG. 8. If not, then the routing request is treated as an original request and the process proceeds to step 908 to further analyze the request and the originator. Step 908 may involve the retrieving of information from a database regarding the originator and the intended destination. Such context information may include, for example, a dialing plan identifier so that the origination and destination addresses are interpreted in the proper context.

A dialing plan ID is a function of a particular enterprise customer having a VPN with its own dialing plan. The dialing plan ID ensures that multiple VPNs can coexist and be adequately differentiated in system 100. For example, an originator dialing extension "2665205" in a private network belonging to Company A should reach the intended destination within Company A, even if Company B sharing the same system 100 happens to also have a "2665205" location in its private numbering plan.

Another example of context information might be a "nature of address" used to distinguish among, for example, public telephone numbers, private dialing plan numbers, and IP addresses. Yet another example of context information is a location identifier, which may be a geographical or logical division and may correspond to dialing plan prefixes, for example.

In general, context info may be any information about the originator, the destination or the session request that must be looked up or otherwise determined by the location server to ensure proper handling of the request. This context info may comprise a variety and plurality of elements but is summarized herein by the notation "contextinfo=".

Note that a "final=yes" parameter should never be received by a location server. Upon detecting the "final=yes" parameter, the NS should refrain from re-querying the location server. Nevertheless, if such a routing request is received, the LS may simply return a response comparable to a SIP "302 Moved Temporarily" message with a single contact comprising the same requested contact provided in the routing request.

After the additional context information is obtained in step 908, the process continues with step 910 where it is determined whether the originator's request is valid. This determination may be based upon such factors as whether the originator is permitted to contact the destination, whether the originator can be authenticated and whether the destination is recognized by the location server.

If the request cannot be validated in step 910, then, in step 909, a reject message of some type is returned to the network server in step 909 and the LS processing is concluded in step 916.

Otherwise, if, in step 910, the session request is found to be valid, then processing continues at step 912 to begin the retrieval of contacts at which the destination party may be reached.

Before describing the processing of step 912 and beyond, it is important to describe the role of step 906 as it relates to the significant efficiencies gained by passing context information with the routing request.

Returning to decision step 904, if it is determined that the Request-URI of the routing request does have the "final=no" parameter, this signifies that the routing request is a subsequent request stemming from a previous initial request. The presence of the "final=no" parameter indicates an inbound message of the type that NS 630b sends along path 656 in FIG. 6.

Upon recognizing this aspect of the routing request, the location server skips steps 908 and 910 and instead executes step 906 to retrieve the necessary context information from the message itself. Considering that the steps of obtaining context information and validating the originator's request have already been performed in processing an initial routing request, there is no need to have the location server repeat these steps for subsequent requests. Therefore, the context information, once obtained, is appended to the messages between the NS and LS.

Message 700, introduced earlier, shows context info parameter 712 provided by the LS in response to the routing request. Message 800 shows how this informaton is provided back to the location server as context info parameter 804. For subsequent requests, this saves the location server from repeating the steps that first provided the context information. This also saves the location server from maintaining any state information between the time of the initial routing request from NS 630a and a subsequent routing request from NS 630b. Due to ringing time at each contact, a subsequent routing request may be presented, if at all, several seconds or even a minute later than a corresponding initial request.

As mentioned earlier, the fact that the subsequent requests are self-contained and require no persistence in the location server also lends several advantages in terms of load balancing and failover. Any location server can handle any initial or subsequent request from a network server. Thus, in FIG. 9A, step 906 relates to skipping steps 908 and 910 and instead reading the previously derived context info values directly from the message header.

Step 912 is next performed when context information has either been obtained by steps 908 and 910 or been retrieved in step 906. In step 912, it is determined whether the destination specified in the routing request, such as the Request-URI of an INVITE message, has a profile. This profile may have been provisioned through an OSS as described earlier. This profile may contain a variety of information affecting the handling of inbound calls. For example, a profile might contain a Find-Me list, call blocking or call forwarding information and even time-of-day and day of week variable contact information. The profile may also comprise temporarily registered contacts where the destination user has recently indicated presence.

If such a profile is not found then, in step 914, a response such as a SIP "302" message is returned to the proxy server that sent the routing request, indicating a single contact determined for the destination.

In some cases, if the contact to the destination is a conventional telephone number, additional steps may be taken to identify a gateway, such as network gateway 107 in FIG. 1, to which the NS should be redirected. The message returned to the proxy will then contain the address of the gateway. After responding to the NS in step 914, the LS is done processing the routing request received in step 902 and processing concludes in step 916.

If, in step 912, a profile is found for the destination, then step 918 is executed to apply any feature processing indicated by the profile, including the invocation of a Find-Me list, if applicable. The result of step 918 will often be a list of contacts. It is also possible that step 918 may yield no contacts, especially if feature processing according to the destination profile specifies the blocking of the originator's call attempt.

Process 900 then continues in FIG. 9B with step 920. If there are no contacts provided by the execution of step 918, then step 924 is performed to return to the proxy a SIP "403" message or the like. Processing then terminates in step 940.

Otherwise, if, in step 920, there are contacts generated by feature and profile processing, then a redirect response, such as a SIP "3XX" message, is created in step 926. The general manner of constructing such a SIP 300-series response is well known in SIP and described in the IETF document RFC 2543. The response at this point may resemble sections 702, 704 and 706 of FIG. 7.

Next, steps 928 through 936 are performed to append one or more contacts to the redirect response. Step 928 involves selecting one of the contacts. Step 930 is then performed to determine if the contact is of a type that may have a profile. If so, then step 932 is executed wherein a "final=no" parameter as appended to the contact along with the context information that has been previously described. Otherwise, if, in step 930, the contact is of a type that cannot have a profile, then, in step 933, only a "final=yes" parameter as added to the text of the contact information. An example of a contact type that may be appropriate for a "final=yes" parameter is a registered address where the destination party has temporarily registered as being present at a particular terminal device. In this case, because the party is only a "visiting" user, it may be inappropriate to invoke the profile of the terminal's regular user, if any.

Whether step 932 or step 933 is executed, step 934 is executed next to add the selected contact to the contact list of the redirect response. Step 936 is then executed to determine if there are more contacts to be processed. If so, then execution returns to step 928 to repeat steps 930 through 934 for all of the contacts that were determined in step 918. After all contacts have been so processed, execution proceeds to step 938 whereupon the redirect response is dispatched back to the proxy that sent the routing request in step 902 and processing then concludes with step 940.

To complement process 900, FIG. 10 describes a process 1000 by which a proxy server handles INVITE messages and interacts with a location server. Process 1000 begins in step 1002 upon the receipt of an INVITE message from an originating terminal, for example. Then, in step 1004, the proxy sends a corresponding routing request to the location server and waits for a response. When the response is received, step 1006 is executed to determine if the response is a redirect response, such as a SIP 300-series response, indicating the return of contact addresses from the location server. If not, then other processing to handle non-redirect type messages is executed in step 1008 and then the process concludes at step 1032. Step 1008 summarizes the processing of myriad other possible message types, the details of which are reasonably well known and are unimportant to describing the present invention.

If, in step 1006, the response from the LS is determined to be a redirect response having contact addresses, processing moves to step 1010 to select one of the contacts returned in the message. Then, in step 1012, the selected contact is examined to determine if a "final=no" parameter appears with the contact address. If so, then step 1016 is executed wherein an INVITE message is sent to the proxy server itself. This message will use the contact line in the redirect response as the requested contact (such as the Request-URI of an INVITE message), including the finality flag and any context information. The reasons and effects of doing this have been fully described earlier. Otherwise, if there is no "final=no" flag found in step 1012, then the proxy simply sends an INVITE message in the usual manner to the contact and waits for a response in step 1020.

Step 1020 of waiting for and handling responses from the contact may involve handling both provisional responses and final responses. For example, the contact may send back a SIP "180 Ringing" provisional message which might be passed along back to the network server and originating terminal. The contact may instead or subsequently send a final response indicating either success or failure of the contact to reach the intended party. Step 1020 is intended to encompass all varieties of responses that might be received. Step 1020 involves the appropriate handling of a variety of possible responses in a manner that is familiar to, or may be readily envisioned by, those of ordinary skill in session initiation techniques.

In step 1022, it is determined whether a session has been successfully established using the contact selected in step 1010. If so, then no further contacts need to be tried, so processing terminates in step 1026. Otherwise, if the attempted contact did not result in session establishment, then step 1024 is executed to determine if there are more contacts to be tried. If so, then processing returns to step 1010 to select the next available contact. Otherwise, if no more contacts are available, then processing of the INVITE message received in step 1002 is concluded in step 1026.

To summarize the net interaction of the network server and location server, FIG. 11 is a flowchart of an overall process 1100 for performing recursive querying to establish a session according to an embodiment of the present invention. The process of FIG. 11 also generalizes the present teachings in that a location server may provide subsets of contacts on an as-needed basis rather than providing all contacts at once. The subsets of contacts might be derived from recursion of nested contacts, as shown by example herein, or by iteration through some other arbitrary division of the superset of contacts. Those of ordinary skill will appreciate that many possible arrangements of subsets might be chosen. Those of ordinary skill will also appreciate that context information passed between proxies and location servers may also assist the location server in selecting subsequent batches of contacts to retrieve. For example, the context info may include a sequence number or a "last contact attempted" to serve as an index for the location server to fetch the next group of contacts for the proxy.

Process 1100 begins in step 1102 when a user accesses a terminal and initiates a session request to reach another party. Moving to step 1104, the originating terminal sends a session request, such as a SIP INVITE message, to a network server or proxy. In step 1106, the proxy sends a corresponding routing request to a location server. In step 1108, the location server examines the request and, based on user profiles, features and other factors, compiles a list of contact addresses by which the destination party might be reached. In accordance with a preferred embodiment of the present invention, the location server may provide a subset of contacts, along with sufficient context information to allow a subsequent re-query of the location server to retrieve further contacts, if and when they are needed.

In step 1110, the location server returns the set of contacts to the proxy, along with the aforementioned context information. In step 1112, the proxy attempts to reach the destination party using the list of contacts provided in step 1110. In step 1114, it is determined whether any of the contacts successfully reach the destination party, as evidenced by the return of a SIP "200 OK" message. If so, then processing continues with step 1118 wherein a media session is established between the originating terminal and the successful contact address and process 1100 is concluded in step 1120.

Returning to step 1114, if it is otherwise determined that none of the contacts provided thus far are successful in reaching the intended party, then, in step 1116, the proxy again consults the location server to obtain a further set of contact addresses. In step 1117, if it is determined, perhaps by the location server, that all contacts have been exhausted, then in step 1122 it is declared that the session cannot be established at the current time. This condition may be handled, for example, by indicating to the originating party that the destination cannot be reached. Following whatever action is appropriate in step 1122, process 1100 then terminates in step 1120.

Returning to step 1117, if there are more contacts known to the location server that have not been given to the proxy server, then, in step 1 118, the location server determines a further set of contact addresses to be tried. In doing so, the location server may use context information provided with the request to perhaps avoid redundant efforts or to assist in determining what set of addresses should be returned next.

Processing then returns to 1110 wherein the location server responds with the further list of contacts. The processing of steps 1110 through 1118 continues until either the destination party is reached or all contacts have been tried without success.

Figure 12:
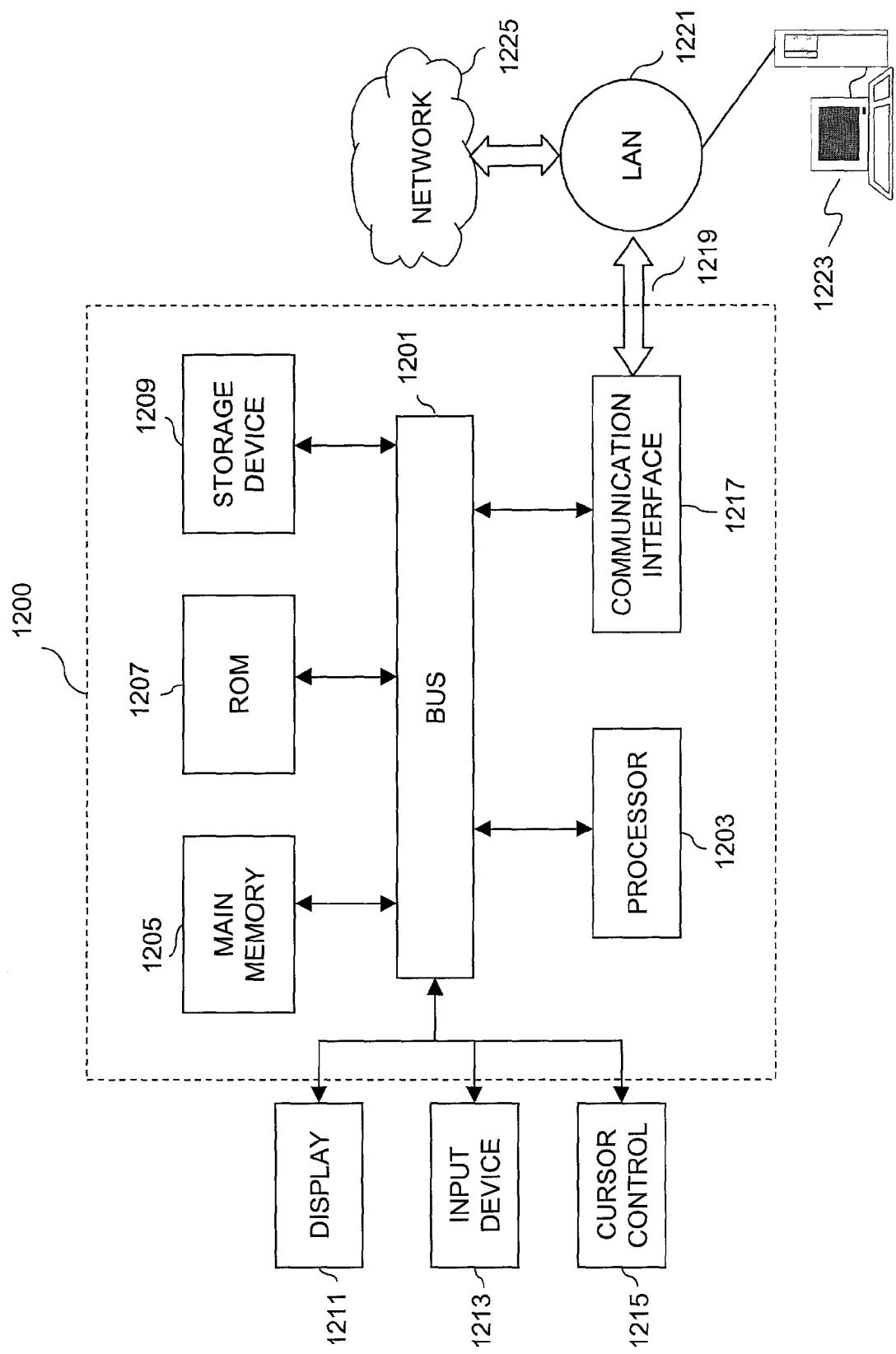
FIG. 12 is a diagram of a computer system that can be used to implement an embodiment of the present invention.

FIG. 12 illustrates a computer system 1200 within which an embodiment according to the present invention can be implemented. The computer system 1200 includes a bus 1201 or other communication mechanism for communicating information, and a processor 1203 coupled to the bus 1201 for processing information. The computer system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions to be executed by the processor 1203. The computer system 1200 further includes a read only memory (ROM) 1207 or other static storage device coupled to the bus 1201 for storing static information and instructions for the processor 1203. A storage device 1209, such as a magnetic disk or optical disk, is additionally coupled to the bus 1201 for storing information and instructions.

The computer system 1200 may be coupled via the bus 1201 to a display 1211, such as a cathode ray tube (CRT), liquid crystal display, active matrix display, or plasma display, for displaying information to a computer user. An input device 1213, such as a keyboard including alphanumeric and other keys, is coupled to the bus 1201 for communicating information and command selections to the processor 1203. Another type of user input device is cursor control 1215, such as a mouse, a trackball, or cursor direction keys for communicating direction information and command selections to the processor 1203 and for controlling cursor movement on the display 1211.

According to one embodiment of the invention, the SIP server functionalities (particularly recursive query capability as described in FIG. 9) are provided by the computer system 1200 in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the present invention. Thus, embodiments of the present invention are not limited to any specific combination of hardware circuitry and software.

The computer system 1200 also includes a communication interface 1217 coupled to bus 1201. The communication interface 1217 provides a two-way data communication coupling to a network link 1219 connected to a local network 1221. For example, the communication interface 1217 may be a digital subscriber line (DSL) card or modem, an integrated services digital network (ISDN) card, a cable modem, or a telephone modem to provide a data communication connection to a corresponding type of telephone line. As another example, communication interface 1217 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1217 sends and receives electrical, electromagnetic, or optical signals that carry digital data streams representing various types of information. Further, the communication interface 1217 can include peripheral interface devices, such as a Universal Serial Bus (USB) interface, a PCMCIA (Personal Computer Memory Card International Association) interface, etc. Although only a single communication interface 1217 is shown, it is recognized that multiple communication interfaces may be employed to communicate with different networks and devices.

The network link 1219 typically provides data communication through one or more networks to other data devices. For example, the network link 1219 may provide a connection through local network 1221 to a host computer 1223, which has connectivity to a network 1225 (e.g. a wide area network (WAN) or the global packet data communication network now commonly referred to as the "Internet") or to data equipment operated by service provider. The local network 1221 and network 1225 both use electrical, electromagnetic, or optical signals to convey information and instructions. The signals through the various networks and the signals on network link 1219 and through communication interface 1217, which communicate digital data with computer system 1200, are exemplary forms of carrier waves bearing the information and instructions.

The computer system 1200 can send messages and receive data, including program code, through the networks, network link 1219, and communication interface 1217. In the Internet example, a server (not shown) might transmit requested code belonging an application program for implementing an embodiment of the present invention through the network 1225, local network 1221 and communication interface 1217. The processor 1204 may execute the transmitted code while being received and/or store the code in storage device 129, or other non-volatile storage for later execution. In this manner, computer system 1200 may obtain application code in the form of a carrier wave.

The term "computer-readable medium" as used herein refers to any medium that participates in providing instructions to the processor 1204 for execution. Such a medium may take many forms, including but not limited to non-volatile media, volatile media, and transmission media. Non-volatile media include, for example, optical or magnetic disks, such as storage device 1209. Volatile media include dynamic memory, such as main memory 1205. Transmission media include coaxial cables, copper wire and fiber optics, including the wires that comprise bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While the present invention has been described in connection with a number of embodiments and implementations, the present invention is not so limited but covers various obvious modifications and equivalent arrangements, which fall within the purview of the appended claims.

REFERENCES

[1] Handley, et al., "SIP: Session Initiation Protocol", IETF RFC 2543, 1999.

[2] Handley, et al., "RFC 2543bis", IETF Internet-Draft, Work in Progress.

[3] Sparks, R., "SIP Call Control: REFER", IETF Internet-Draft, Work in Progress.

[4] Johnston, et. al., "SIP Telephony Call Flow Examples", IETF Internet-Draft, Work in Progress.

[5] Johnston, et. al., "SIP Service Examples", IETF Internet 127-Draft, Work in Progress.

What is claimed is:

1. A method of establishing a communication session with at least one party coupled to a communication system, comprising:

from a location server, obtaining at least one first destination address related to communicating with the party;

providing, to the location server, context information relating to processing that occurs in the location server;

attempting to establish the session through the communication system using the first destination address; and depending on whether the session is established using the first destination address, obtaining from the location server at least one second destination address related to communicating with the party and attempting to establish the session using the second destination address, wherein the second destination address differs from the first destination address, and, wherein the context information is obtained from the location server in conjunction with obtaining the first destination address, and the context information is provided to the location server in conjunction with obtaining the second destination address.

2. The method of claim 1 wherein the first destination address comprises a first communication system address associated with the party, and the second destination address comprises a second communication system address associated with the party.

3. The method of claim 1 wherein the context information comprises at least one of: a nature-of-address indicator, a dial plan identifier, or a location identifier.

4. The method of claim 1 further comprising obtaining, from the location server, context information relating to processing that occurs in the location server.

5. The method of claim 4 wherein the context information comprises at least one of: a nature-of-address indicator, a dial plan identifier, or a location identifier.

6. The method of claim 1 wherein the location server uses the context information in the course of providing the second destination address.

7. The method of claim 1 wherein the context information comprises at least one of: a nature-of-address indicator, a dial plan identifier, or a location identifier.

8. In a communication system comprising a location server, a method of establishing a communication session with at least one party coupled to the communication system, comprising the steps of:

submitting a first request to the location server for contact information associated with the party;

obtaining a first response from the location server responsive to the first request, the first response comprising at least one first set of one or more contacts associated with the party;

attempting to establish the session with the party using the first set of contacts;

responsive to whether the first set of contacts results in establishing the session, conditionally performing the steps of:

submitting at least one second request to the location server;

obtaining a second response from the location server responsive to the second request, the second response comprising at least one second set of one or more contacts for the party; and attempting to establish the session with the party using the second set of contacts, wherein the second set of one or more contacts differs from the first set of one or more contacts.

9. The method of claim 8 wherein the second request relates to at least one contact provided in the first response.

10. The method of claim 8 wherein the second request is initiated in response to at least one contact in the first set of contacts in the first response.

11. The method of claim 8 wherein the second request is submitted conditionally upon the content of the first response.

12. The method of claim 11 wherein the first response comprises information relating to whether the second request should be submitted.

13. The method of claim 12 wherein at least one contact in the first response comprises information relating to whether the second request should be submitted.

14. The method of claim 8 further comprising providing to the location server context information relating to processing that occurs in the location server.

15. The method of claim 14 wherein the context information comprises at least one of: a nature of address indicator, a dial plan identifier, or a location identifier.

16. The method of claim 14 wherein the location server uses the context information provided in conjunction with the second request in the course of preparing the second response.

17. The method of claim 8 further comprising obtaining from the location server context information relating to processing that occurs in the location server.

18. The method of claim 17 wherein the context information comprises at least one of: a nature of address indicator, a dial plan identifier, or a location identifier.

19. The method of claim 17 wherein the location server uses the context information provided in conjunction with the second request in the course of preparing the second response.

20. The method of claim 8 wherein the context information is obtained from the location server in conjunction with the first response and the context information is provided to the location server in conjunction with the second request.

21. The method of claim 20 wherein the context information comprises at least one of: a nature of address indicator, a dial plan identifier, or a location identifier.

22. The method of claim 20 wherein the location server uses the context information provided in conjunction with the second request in the course of preparing the second response.

23. A server for providing contact information about at least one party in a communications system comprising:
    means for receiving a first request for contact information for the party;
    means for determining a first contact set comprising zero or more contacts for the party;
    means for outputting a first response, responsive to the first request, comprising the first contact set;
    means for receiving a second request, subsequent to the first request, for contact information for the party;
    means for determining a second contact set comprising zero or more contacts for the party;
    means for outputting a second response to the second request comprising the second contact set;
    and wherein the second contact set differs from the first contact set.

24. The server of claim 23 wherein at least one of the first contact set and second contact set is a subset of all contacts for the party maintained by the location server.

25. The server of claim 23 wherein the second request relates to at least one contact provided in the first response.

26. The server of claim 23 wherein the second request is initiated in response to at least one contact in the contact set in the first response.

27. The server of claim 23 wherein the second request is submitted conditionally upon the content of the first response.

28. The server of claim 27 wherein the first response comprises information relating to whether the second request should be submitted.

29. The server of claim 23 further comprising means for providing, in conjunction with the first response, at least one indicator of whether the second request should be submitted.

30. The server of claim 23 wherein at least one contact in the first response comprises information relating to whether the second response should be submitted.

31. The server of claim 23 further comprising means for determining context information pertaining to the first request.

32. The server of claim 31 wherein the second request comprises the context information.

33. The server of claim 32 wherein the location server uses the context information provided in the second request in the course of preparing the second response.

34. The server of claim 31 wherein the context information comprises at least one of: a nature of address indicator, a dial plan identifier, or a location identifier.

35. The server of claim 34 wherein the first response comprises the context information.

36. The server of claim 34 wherein the location server uses the context information provided in the second request in the course of preparing the second response.

37. The server of claim 34 wherein the context information comprises at least one of: a nature of address indicator, a dial plan identifier, or a location identifier.

38. The server of claim 34 wherein the second request comprises the context information.

39. The server of claim 38 wherein the location server uses the context information provided in the second request in the course of preparing the second response.

40. The server of claim 38 wherein the context information comprises at least one of: a nature of address indicator, a dial plan identifier, or a location identifier.

41. A proxy server for processing at least one request to establish a session with a party in a communications system comprising:
    means for submitting to a location server a first request for contact information for the party;
    means for receiving from the location server a first response to the first request, the first response comprising a first contact set;
    means for determining from the first response whether a second request may be performed to obtain further contact information;
    means for initiating the second request based upon the first response; and
    means for submitting to the location server the second request.

42. The proxy server of claim 41 wherein at least one contact in the first response comprises information indicating the necessity of performing the second request.

43. The proxy server of claim 41 further comprising means for attempting to establish the session using at least one of the first contact set and the second contact set from the location server.

44. The proxy server of claim 41 wherein, depending upon the content of the first response, the proxy server dispatches the second request to itself.

45. The proxy server of claim 41 wherein the location server associates a finality indicator with at least one contact and the second request is conditionally submitted in response to a state of the finality indicator.

46. The proxy server of claim 41 further comprising:
    means for receiving at least one context information from the location server in conjunction with the first response; and means for providing the context information in conjunction with the second request.

47. The proxy server of claim 46 wherein the context information comprises at least one of: a nature-of-address indicator, a dial plan identifier, or a location identifier.

48. A computer-readable storage medium having computer-executable instructions for performing a method for providing contact information for a party, the method comprising the steps of:
   receiving a first request for contact information for the party; determining a first contact set comprising zero or more contacts for the party;
   outputting a first response to the first request comprising the first contact set; receiving at least one second request, subsequent to the first request, for contact information for the party;
   determining a second contact set comprising zero or more contacts for the party; and
   outputting a second response to the second request comprising the second contact set; wherein the second contact set may differ from the first contact set.

49. The computer-readable storage medium of claim 48 wherein the method further comprises the steps of:
   determining context information related to the first request;
   outputting the context information in conjunction with outputting the first response;
   receiving the context information in conjunction with receiving the second request; and applying the context information in determining the second contact set.

50. A computer-readable storage medium having computer-executable instructions for performing a method for obtaining contact information for a party, the method comprising the steps of:
   submitting to a location server a first request for contact information for the party; receiving from the location server a first response to the first request, the first response comprising a first contact set;
   determining from the first response whether at least one second request should be performed to obtain further contact information;
   initiating the second request based upon the first response;
   receiving context information from the location server in conjunction with the first response; and
   providing the context information to the location server in conjunction with the second request.

51. A method for providing contact information about at least one party in a communications system, the method comprising:
   receiving a first request for contact information for the party;
   determining a first contact set comprising zero or more contacts for the party;
   outputting a first response, responsive to the first request, comprising the first contact set;
   receiving a second request, subsequent to the first request, for contact information for the party;
   determining a second contact set comprising zero or more contacts for the party;
   outputting a second response to the second request comprising the second contact set, and wherein the second contact set differs from the first contact set.

* * * * *